United States Patent [19]

Tsuru

[11] Patent Number: 5,597,619
[45] Date of Patent: *Jan. 28, 1997

[54] FILTERING MATERIAL AND METHOD OF PRODUCING THE SAME

[75] Inventor: Sumiaki Tsuru, Tokyo, Japan

[73] Assignee: Bestex Kabushiki-Kaisha, Tokyo, Japan

[*] Notice: The term of this patent shall not extend beyond the expiration date of Pat. No. 5,143,752.

[21] Appl. No.: 419,758

[22] Filed: Apr. 10, 1995

Related U.S. Application Data

[63] Continuation of Ser. No. 31,901, Mar. 16, 1993, abandoned.

[30] Foreign Application Priority Data

Apr. 16, 1992 [JP] Japan .................... 4-091684

[51] Int. Cl.$^6$ .............. B05D 5/00; B05D 1/36; B05D 1/40
[52] U.S. Cl. .............. 427/244; 427/202; 427/421; 427/434.4
[58] Field of Search ................ 427/244, 202, 427/194, 2.30, 2.31, 434.4, 421

[56] References Cited

U.S. PATENT DOCUMENTS

| | | | |
|---|---|---|---|
| 3,019,127 | 1/1962 | Czerwonka et al. | 427/202 |
| 4,168,326 | 9/1979 | Broemer et al. | 427/2 |
| 4,699,681 | 10/1987 | Kasmark, Jr. et al. | 427/202 |
| 5,043,069 | 8/1991 | Brandon et al. | 427/244 |
| 5,124,177 | 6/1992 | Kasmark, Jr. et al. | 427/202 |
| 5,128,169 | 7/1992 | Saita et al. | 427/2 |
| 5,143,752 | 9/1992 | Nakajima et al. | 427/244 |
| 5,296,254 | 3/1994 | Tsuru | 427/2.31 |
| 5,352,418 | 10/1994 | Tsuru | 427/2.31 |

FOREIGN PATENT DOCUMENTS

| | | |
|---|---|---|
| 0240824 | 10/1987 | European Pat. Off. . |
| 0379378 | 7/1990 | European Pat. Off. . |
| 0393723 | 10/1990 | European Pat. Off. . |
| 3712875 | 11/1988 | Germany . |

Primary Examiner—Diana Dudash
Attorney, Agent, or Firm—Wenderoth, Lind & Ponack

[57] ABSTRACT

A filtering material employable as a basic material for a sanitary mask, a deodorizing filter or the like includes as essential components calcium phosphate particles, a water soluble glucan and a sheet-shaped raw material, and the calcium phosphate particles are caused to adhere to the sheet-shaped raw material with the aid of the water soluble glucan serving as a binder. A method of a filtering material is typically practiced by way of a first step of dispersing a predetermined quantity of calcium phosphate particles and a predetermined quantity of water soluble glucan in water to prepare an aqueous treatment solution, a second step of dipping a sheet-shaped raw material in the aqueous treatment solution and taking up the sheet-shaped raw material coated with the aqueous treatment solution and a third step of drying the sheet-shaped raw material coated with the aqueous treatment solution. The method of producing a filtering material may be practiced by way of a first step of dissolving a predetermined quantity of water soluble glucan in water to prepare an aqueous preliminary treatment solution, a second step of adhering the aqueous preliminary treatment solution to a sheet-shaped raw material, a third step of adhering calcium phosphate particles to the sheet-shaped raw material before the sheet-shaped raw material having the aqueous preliminary treatment solution adhering thereto is completely dried, and a fourth step of drying the sheet-shaped raw material.

12 Claims, 1 Drawing Sheet

FILTERING MATERIAL AND METHOD OF PRODUCING THE SAME

This application is a continuation of now abandoned application, Ser. No. 08/031,902, filed Mar. 16, 1993, now abandoned.

BACKGROUND OF THE INVENTION

1. Field of the Invention

The present invention relates generally to a filtering material employable in various kinds of application fields in the form of a sanitary filter, a deodorizing filter incorporated in various kinds of deodoring units, foodstuff packing materials having a capability of sterilizing and deodorizing or the like. More particularly, the present invention relates to a filtering material which can effectively and reliably adsorb very fine infectious or antigenous particles such as viruses, bacteria or the like. Further, the present invention relates to a method of producing a filtering material of the foregoing type.

2. Description of the Prior Art

The applicant common to the present invention has already made proposals with respect to a method of producing a novel filtering material for capturing very fine foreign material such as virus or the like in Japanese Patent Applications Nos. 278487/1990, 29301/1991 and 163903/1991.

For example, each of the proposed methods is practiced by way of the steps of preparing an aqueous treatment solution by dispersively dissolving a predetermined quantity of porous apatite particles and a predetermined quantity of a water soluble glucan in water, dipping a sheet-shaped raw material in the aqueous treatment solution or spraying the latter over a sheet-shaped raw material or bringing a rotating roller wetted with the aqueous treatment solution in contact with a sheet-shaped raw material, and drying the sheet-shaped raw material coated with the aqueous treatment solution while the porous apatite particles are included in the sheet-shaped raw material with the aid of the water soluble glucan serving as a binder.

In addition, a method of the foregoing type proposed by the applicant is practiced by way of the steps of preparing an aqueous preliminary treatment solution by dissolving only a water soluble glucan in water to prepare an aqueous preliminary treatment solution, allowing the preliminary treatment solution to adhere to a sheet-shaped raw material, thereafter, allowing porous apatite particles to adhere to the sheet-shaped raw material coated with the aqueous preliminary treatment solution before the preliminary treatment solution is completely dried, and finally, drying the sheet-shaped raw material including the porous apatite particles with the aid of the water soluble glucan serving as a binder.

A characterizing feature of any one of the conventional methods of the foregoing type each proposed by the applicant consists in that porous apatite particles composed of a kind of calcium phosphate particles are bonded to a sheet-shaped raw material with the aid of water soluble glucan serving as a binder.

In contrast with a conventional filtering material, a filtering material produced by employing each of the conventional methods proposed by the applicant exhibits excellent properties of adsorbing and filtering very fine infectious or antigenous foreign materials such as viruses, pollen, or the like, unattainable with conventional filtering materials. In the circumstances as mentioned above, the filtering material produced by employing each of the aforementioned proposed conventional methods does not exhibit anything basically inconvenient for filter's users.

However, in addition to the necessity for adding a gas generating substance to the raw material for the purpose of imparting porosity to the apatite, and moreover, exactly controlling the steps of sintering and granulizing, it is required that the composition ratio of phosphor to calcium be strictly controlled. For this reason, there arises a slight inconvenience that it is considerably difficult to practically produce a filtering material.

SUMMARY OF THE INVENTION

The present invention has been made in consideration of the foregoing background.

An object of the present invention is to provide a filtering material which can exhibit the same performances as mentioned above without any usage of porous apatite particles.

Another object of the present invention is to provide a method of producing a filtering material of the foregoing type.

According to a first aspect or embodiment of the present invention, there is provided a filtering material which comprises calcium phosphate particles, a water soluble glucan, and a sheet-shaped raw material wherein the calcium phosphate particles are caused to adhere to the sheet-shaped raw material with the aid of the water soluble glucan serving as a binder.

According to a second aspect or embodiment of the present invention, there is provided a method of producing a filtering material of the foregoing type, wherein the method comprises a first step of dispersing calcium phosphate particles of 0.5 to 40% by weight and a water soluble glucan of 0.5 to 15% by weight in water to prepare an aqueous treatment solution, a second step of dipping a sheet-shaped raw material in the aqueous solution and taking up the sheet-shaped raw material coated with the aqueous treatment solution, and a third step of drying the sheet-shaped raw material coated with the aqueous treatment solution after completion of the taking-up operation.

It is preferable that the content of calcium phosphate in the aqueous treatment solution be set to 0.5 to 30% by weight.

In addition, according to a third aspect or embodiment of the present invention, there is provided a method of producing a filtering material of the foregoing type, wherein a method comprises a first step of dispersing calcium phosphate particles of 0.5 to 40% by weight and a water soluble glucan of 0.5 to 15% by weight in water to prepare an aqueous treatment solution, a second step of spraying the aqueous treatment solution over a sheet-shaped raw material, and a third step of drying the sheet-shaped raw material coated with the sprayed aqueous treatment solution.

It is likewise preferable that the content of calcium phosphate particles in the aqueous treatment solution be set to 0.5 to 30% by weight.

Additionally, according to a fourth aspect or embodiment of the present invention, there is provided a method of producing a filtering material of the foregoing type, wherein the method comprises a first step of dispersing calcium phosphate particles of 0.5 to 40% by weight and a water soluble glucan of 0.5 to 15% by weight in water to prepare an aqueous treatment solution, a second step of allowing the aqueous treatment solution to adhere to a sheet-shaped raw material with the aid of a rotating roller of which part is always immersed in the aqueous treatment solution, and a third step of drying the sheet-shaped raw material having the aqueous treatment solution adhering thereto.

It is likewise preferable that a content of calcium phosphate in the aqueous treatment solution be set to 0.5 to 30% by weight.

Further, according to a fifth aspect or embodiment of the present invention, there is provided a method of producing a filtering material of the foregoing type, wherein the method comprises a first step of dissolving a water soluble glucan of 0.5 to 25% by weight in water to prepare an aqueous preliminary treatment solution, a second step of allowing the aqueous preliminary treatment solution to adhere to a sheet-shaped raw material, a third step of allowing calcium phosphate particles to adhere to the sheet-shaped raw material before the sheet-shaped raw material having the aqueous preliminary treatment solution adhering thereto is completely dried, and a fourth step of drying the sheet-shaped raw material having the aqueous preliminary treatment solution and the calcium phosphate particles adhering thereto.

With the method to be practiced according to the fifth embodiment of the present invention, it is recommended that the second step be executed by dipping the sheet-shaped raw material in the aqueous preliminary treatment solution and then taking up the sheet-shaped raw material coated with the aqueous preliminary treatment solution so as to allow the aqueous preliminary treatment solution to adhere to the sheet-shaped raw material.

Alternatively, the second step may be executed by spraying the aqueous preliminary treatment solution over the sheet-shaped raw material so as to allow the aqueous preliminary treatment solution to adhere to the sheet-shaped raw material.

Otherwise, the second step may be executed by bringing the sheet-shaped raw material in contact with a rotating roller of which part is always immersed in the aqueous treatment solution so as to allow the aqueous preliminary treatment solution to adhere to the sheet-shaped raw material.

In addition, with the method to be practiced according to the fifth aspect of the present invention, it is recommended that the third step be executed by spreading the calcium phosphate particles over the sheet-shaped raw material having the aqueous preliminary treatment solution adhering thereto so as to allow the calcium phosphate particles to adhere to the sheet-shaped raw material.

Alternatively, the third step may be executed by blowing the calcium phosphate particles over the sheet-shaped raw material coated with the aqueous preliminary treatment solution so as to allow the calcium phosphate particles to adhering to the sheet-shaped raw material.

A characterizing feature of the filtering material constructed according to the first embodiment of the present invention consists in that the calcium phosphate particles are bonded to the sheet-shaped raw material with the aid of the water soluble glucan serving as a kind of binder.

Another characterizing feature of the filtering material of the foregoing type consists in that the calcium phosphate particles adsorb viruses, bacteria, fungus, pollen or the like by the action of ionic bond or hydrogen bond due to the glucan.

In addition, viruses, bacteria, fungus, pollen or the like can reliably be adsorbed in an ample quantity of hydroxylis present in molecules of the water soluble glucan by the action the hydrogen bond of the hydroxylis to the saccharide chain and muccosaccharides on the surface of virus, bacteria, fungus, pollen or the like.

The first step of the second embodiment of the invention as defined is executed by putting calcium phosphate particles and a water soluble glucan in water at the ratio defined therein and then stirring them to prepare an aqueous viscous treatment solution in which the calcium phosphate particles and the water soluble glucan are uniformly distributed in water. The calcium phosphate particles are uniformly distributed in the resultant aqueous treatment solution without precipitation.

The second step of the second embodiment of this invention is executed by dipping the sheet-shaped raw material in the aqueous treatment solution and then taking it up therefrom so as to allow the calcium phosphate particles and the water soluble glucan to adhere to the sheet-shaped raw material.

Subsequently, the third step of said second embodiment of the invention is executed by drying the sheet-shaped raw material having the calcium phosphate particles and the water soluble glucan adhering thereto. On completion of the drying, the calcium phosphate particles are bonded to the sheet-shaped raw material via the water soluble glucan serving as a binder, whereby production of the filtering material as defined by claim 1 of the claim clause is completed.

The method of the third embodiment of the invention is different from that of the second embodiment in respect to the second step of allowing the aqueous treatment solution to adhere to the sheet-shaped raw material in such a manner that the aqueous treatment solution is sprayed over the sheet-shaped raw material.

In case that the surface of the sheet-shaped raw material is comparatively smooth like a paper and fibers are closely entangled with each other in the sheet-shaped raw material, calcium phosphate particles are hardly caused to penetrate in fibers in the sheet-shaped raw material merely by dipping it in the aqueous treatment solution. Even though the calcium phosphate particles have been caused to adhere to the surface of the sheet-shaped raw material via the water soluble glucan serving as a binder, they are readily peeled away from the sheet-shaped raw material. In the circumstances as mentioned above, an advantageous feature of the spraying of the aqueous treatment solution over the sheet-shaped raw material consists in that calcium phosphate particles are forcibly caused to penetrate into fibers of the sheet-shaped raw material with the aid of kinetic energy given by the spraying so that the calcium phosphate particles are more tightly bonded to, the sheet-shaped raw material.

In case paper is used as a sheet-shaped raw material, it usually becomes weak when it is wetted with water. Thus, there arises a malfunction in that the paper is broken or torn in the course of taking-up from the aqueous treatment solution. To prevent an occurrence of the foregoing malfunction, employment of the spraying process is advantageously acceptable.

Also in case that the sheet-shaped raw material is not a paper but is an unwoven cloth or a woven fabric, the calcium phosphate particles are readily caused to penetrate in the fibers by allowing the aqueous treatment solution to intensely collide against the sheet-shaped raw material with the aid of kinetic energy generated by the spraying of the aqueous treatment solution.

The first step and the third step of the method of the invention as defined in the third embodiment of the invention as discussed above are identical with those of the invention as defined in the second embodiment. Thus, a repeated detailed description of these steps is not required.

In addition, the first step and the third step of the method of the fourth embodiment are identical with those of the invention as defined by second and third embodiment. Thus, a detailed description of these steps not required.

The method of the invention as defined by the fifth embodiment is different from that of the other embodiment in respect of the fact that the water soluble glucan and the calcium phosphate particles are separately caused to adhere to the sheet-shaped raw material at a certain time interval therebetween.

Specifically, the first step of the method of the invention as defined in the fifth embodiment is executed by dissolving a water soluble glucan of 0.5 to 25% by weight in water and then stirring the resultant mixture. On completion of the stirring, the water soluble glucan is uniformly distributed in water, whereby an aqueous viscous preliminary treatment solution can be obtained.

Next, the second step of the fifth embodiment is executed by allowing the aqueous preliminary treatment solution to adhere to the sheet-shaped raw material. To this end, it is acceptable that the sheet-shaped raw material is dipped in the aqueous treatment solution and it is then taken up therefrom in the same manner as the method of the invention as defined in the second embodiment of the invention. Alternatively, the aqueous preliminary treatment solution may adhere to the sheet-shaped raw material with the aid of a rotating roller of which part is always immersed in the aqueous preliminary treatment solution, in the same manner as in the fourth embodiment.

Next, the third step of the fifth embodiment is executed by allowing calcium phosphate particles to adhere to the sheet-shaped raw material coated with the aqueous preliminary treatment solution before the aqueous preliminary treatment solution is completely dried. To this end, it is acceptable that a sifter filled with calcium phosphate particles is caused to vibrate above the sheet-shaped raw material in the horizontal direction. Alternatively, calcium phosphate particles which are falling down from a vibrating hopper or a vibrating sifter are blown toward the sheet-shaped raw material by actuating an air gun.

The extent of dryness of the sheet-shaped raw material having the calcium phosphate particles adhering thereto is adequately determined depending on the kind of the sheet-shaped raw material and an application field of a product of filtering material.

The step of drying the sheet-shaped raw material having the aqueous preliminary treatment solution and the calcium phosphate particles adhering thereto in the fifth embodiment is identical to the other embodiments. Thus, a detailed description of such step is not required.

Other objects, features and advantages of the present invention will become apparent from a reading of the following description which has been made in conjunction of the accompanying drawings.

BRIEF DESCRIPTION OF THE DRAWINGS

The present invention is illustrated in the following drawings in which.

DESCRIPTION OF THE PREFERRED EMBODIMENT

Figure 1:
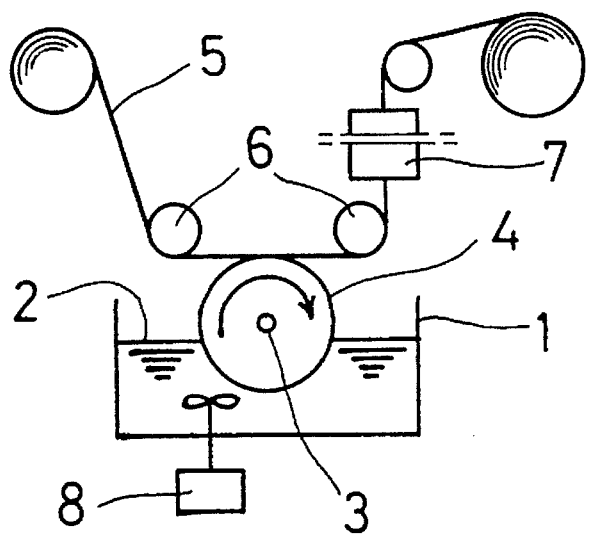
FIG. 1 is an illustrative view which schematically shows the structure of an apparatus for allowing an aqueous treatment solution to adhere to a sheet-shaped raw material with the aid of a rotating roller of which part is always immersed in the aqueous treatment solution.

The present invention will now be described in detail hereinafter with reference to the accompanying drawings which shows two types of apparatuses, one of them being such that an aqueous treatment solution adheres to a sheet-shaped raw material with the aid of a rotating roller of which part is always immersed in the aqueous treatment solution and the other one being such that calcium phosphate particles are caused to adhere to a sheet-shaped raw material coating with an aqueous treatment solution by blowing the calcium phosphate particles over the sheet-shaped raw material. It should be noted that production of a filtering material constructed according to the invention as defined in the first aspect of embodiment becomes readily apparent from a description of a method of producing a filtering material according to the invention as defined be any of the other embodiments described above.

First, a method to be practiced according to the invention as defined by claim 2 of the claim clause includes a first step of stirring calcium phosphate particles of 0.5 to 40% by weight and a water soluble glucan of 0.5 to 15% in water to prepare an aqueous treatment solution. A process of executing the second step constituting the method will be described in detail below.

Calcium phosphate to be used for the filtering material is such that a mole ratio of calcium to phosphor (hereinafter referred to simply as the Ca/P ratio) ranges from 1.0 to 20, preferably 1.3 to 1.8, more preferably from 1.5 to 1.67. It should be added that calcium phosphate having a Ca/P ratio of 1.5 is called tricalcium phosphate and calcium phosphate having a Ca/P ratio of 1.67 is called apatite.

To practice each of the conventional methods proposed by the applicant, porous apatite particles were employed as an essential component constituting the filtering material. Later, the inventors conducted a variety of research works and found that not only apatite but also calcium phosphate exhibited substantially same adsorbing properties.

Calcium phosphate particles having a particle size of 0.1 to 50 μm is practically employable for practicing the method of the present invention. It is recommended that calcium phosphate particles having a large particle size be prepared in the form of porous secondary particles. Each porous secondary particle is such that very fine calcium phosphate crystalline particles (primary particle) are aggregated together to become a particle having a large particle size. For example, a suspension containing very fine calcium phosphate particles is sprayed in an environment having a high temperature to prepare porous secondary particles. Otherwise, very fine calcium phosphate particles are stirred and granulated in the presence of a binder. Secondary particles each having excellent rigidity can be obtained by baking the secondary porous particles prepared in the above-described manner.

The reason why the content of calcium phosphate is defined in the above-noted manner is that when it exceeds 40% by weight, the air permeability of a product of filtering material is degraded, whereas if it is less than 0.5%, the practicability of an ability of adsorbing antigeneous or infectious very fine particles is undesirably lost.

When the ratio of calcium phosphate particles to the product of the filtering material exceeds 30% by weight, the filtering material loses flexibility. Consequently, the filtering material becomes unsuitable as a raw material for, e.g., a mask or the like. However, in case that a filtering material is used without any necessity for repeated bending or folding, the filtering material can practically be used without any trouble.

Similarly, the reason why the quantity of water soluble glucan is defined as above is that when it exceeds 15% by weight, the air permeability of the filtering material is degraded, while if it is less than 0.5% by weight, the ability of adsorbing antigenous or infectious very fine particles is excessively reduced, resulting in a product of filtering material failing to exhibit practicability.

It is recommended that e.g., triose having a molecular weight of 30,000 to 300,000 be used as a water soluble glucan. In addition to the fact that the triose itself adsorptively captures flying antigenous or infectious very fine particles, it has molecules each serving to bond fibers present on the surface of the sheet-shaped raw material to each other while it is interposed between adjacent fibers. The triose has a sufficient quantity of hydroxyls in the molecules thereof so that it adsorptively captures very fine particles such as pollen, fungus, bacteria or the like each having a structure of which surface is covered with a saccharide chain or a muccosaccharide, by the function of the hydrogen bond or a the like.

When the second step of the second embodiment is carried out by dipping the sheet-shaped raw material in the aqueous treatment solution and then taking it up therefrom, the aqueous treatment solution adheres to the sheet-shaped raw material in such a manner that the sheet-shaped raw material is wetted with the aqueous treatment solution. It is acceptable that the dipping of the sheet-shaped raw material in the aqueous treatment solution is achieved by lowering the sheet-shaped raw material in the aqueous treatment solution and then raising it up therefrom while holding it with operator's hands. Alternatively, it may be achieved by continuously unrolling a strip of sheet-shaped raw material preliminarily wound in the form of a roll and then allowing it to move through the aqueous treatment solution in the treatment solution bath from one side to the opposite side of the treatment solution bath in the dipped state. In this case, the aqueous treatment solution can adhere to the sheet-shaped raw material at a high efficiency.

A woven cloth and an unwoven cloth woven with natural fibers, synthetic fibers or a mixture of both the fibers are employable as a typical sheet-shaped raw material. In addition, a fabric woven with cotton fibers and a sheet of foamed polyurethane are also employed for the same purpose.

After the aqueous treatment solution adheres to the sheet-shaped raw material, the latter is dried at the third step of the method to produce a filtering material. The drying is usually achieved at a room temperature. Alternatively, when the sheet-shaped raw material coated with the aqueous treatment solution is caused to continuously pass through a hot atmosphere having a temperature of, e.g., 100° to 150° C., the drying can be achieved at a high efficiency.

The method of the invention as defined by the third embodiment is identical to that of the second embodiment in respect to the first step and the third step with the exception that the second step is different Specifically, according to the invention as defined in the third embodiment, the aqueous treatment solution is caused to adhere to the sheet-shaped raw material by spraying the aqueous treatment solution over the sheet-shaped raw material.

In this case, in contrast with the method of the invention as defined in the second embodiment wherein the aqueous treatment solution adheres to the sheet-shaped raw material by dipping the latter in the aqueous treatment solution and then taking it up therefrom, a paper having poor toughness and readily broken or torn when it is wetted with water can be employed as a sheet-shaped raw material. In addition to the fabric woven with cotton fibers and the sheet of foamed polyurethane as mentioned above, a thin pulp paper or a thin traditional Japanese paper having excellent air permeability can also be employed as a sheet-shaped raw material.

When the aqueous treatment solution is sprayed over the sheet-shaped raw material, mouth blowing, i.e., so-called mouth liquid atomizing can be employed on the experimental basis. Since calcium phosphate particles can not fly at a sufficiently high speed when a liquid atomizing process is employed, it is preferable that the distance between a sheet-shaped raw material and an atomizer be set at about 30 cm.

When the filtering material is produced on the industrial basis, it is preferable that a spray gun operable at an air pressure of several $kg/cm^2$ is used for practicing a spraying/atomizing process. In addition, it is preferable that a distance between the sheet-shaped raw material and the spray gun is set to about 1 m. Additionally, it is desirable from the viewpoint of mass production that a strip of sheet-shaped raw material be preliminarily wound in the form of a roll so that as the strip of sheet-shaped raw material is unrolled, it is continuously caused to move in front of the spray gun.

A quantity of aqueous treatment solution to be sprayed over the sheet-shaped raw material per unit time is determined such that the whole surface of the sheet-shaped raw material is sufficiently wetted with the sprayed aqueous treatment solution. If a part of the sheet-shaped raw material fails to be wetted with the aqueous treatment solution, this means that the filtering material is not acceptable because the foregoing part is not coated with the aqueous treatment solution being an empty spot opened in the filter. On the contrary, if an excessive quantity of aqueous treatment solution is sprayed over the sheet-shaped raw material, there arises a malfunction that the excessive quantity of aqueous treatment falls of the sheet-shaped raw material.

When the sheet-shaped raw material has a heavy thickness, it is recommended that the aqueous treatment solution be sprayed over the sheet-shaped raw material from the opposite sides.

In case that the sheet-shaped raw material is a sheet of paper having poor toughness, it is preferable that the aqueous treatment solution be sprayed over the paper sheet from the front side while the rear surface of the paper sheet is placed on a backup plate. On completion of the spraying operation, the paper sheet adheres to the backup plate, resulting in subsequent handling or treatment being easily achieved.

The method of the invention as defined by the fourth embodiment is different from that of the second and third embodiments in respect of the second step of allowing the aqueous treatment solution to adhere to the sheet-shaped raw material. Specifically, the second step is executed by allowing the aqueous treatment solution to adhere to the sheet-shaped raw material with the aid of rotating roller of which part is always immersed in the treatment solution bath.

Also in this case, a woven cloth and an unwoven cloth woven with natural fibers, synthetic fibers or a mixture of both the fibers are employable as a typical sheet-shaped raw material. In addition, a fabric woven with cotton fibers, a sheet of foamed polyurethane, a thin pulp paper having excellent air permeability and a traditional Japanese paper are also employable for the same purpose.

It is recommended that adhesion of the aqueous treatment solution to the sheet-shaped raw material be achieved by employing an apparatus as shown in FIG. 1. Specifically, as shown in the drawing, a drum 4 including a horizontally extending shaft 3 of which part is always immersed in an aqueous treatment solution 2 in a treatment solution bath 1 is continuously rotated so that the outer surface of the drum 4 is wetted with the aqueous treatment solution 2 as if the aqueous treatment solution is continuously pumped up from the treatment solution bath 1.

On the other hand, a strip of sheet-shaped raw material 5 is preliminarily wound in the form of a roll, and as the sheet-shaped raw material 5 is unrolled from the roll, it is brought in contact with the rotating drum 4 while it is bridged between an opposing pair of idle rollers 6. With the apparatus shown in FIG. 1, it is assumed that the sheet-shaped raw material 5 moves from the left-hand side to the right-hand side as seen in the drawing and then passes through a heater 7 disposed at the intermediate position of a movement path so as to dry the sheet-shaped raw material coated with the aqueous treatment solution 2. At this time, the feeding speed of the sheet-shaped raw material 5 is determined so as not to exceed the circumferential speed of the drum 4. This is because if the feeding speed of the sheet-shaped raw material 5 exceeds the circumferential speed of the drum 4, there arises a malfunction that the aqueous treatment solution can not sufficiently be delivered to the sheet-shaped raw material 5, resulting in some part of the sheet-shaped raw material 5 failing to be coated with the aqueous treatment solution 2.

As is apparent from the above description, a quantity of adhesion of the aqueous treatment solution 2 to the sheet-shaped raw material 5 varies, depending on a difference between the circumferential speed of the drum 4 and the moving speed of the sheet-shaped raw material 5. For this reason, it is assumed that a quantity of adhesion of the aqueous treatment solution 2 to the sheet-shaped raw material 5 is determined such that the sheet-shaped raw material 5 is sufficiently wetted with the aqueous treatment solution 2 at all times. This is because if a part of the sheet-shaped raw material 5 fails to be wetted with the aqueous treatment solution 2, the foregoing part does not function as a filtering material, and moreover, if the sheet-shaped raw material 5 is excessively wetted with the aqueous treatment solution 2, an extra part of the aqueous treatment solution 2 falls down uselessly. In some case, the sheet-shaped raw material 5 may continuously be supplied in the leftward direction while the drum 4 is unchangeably rotated in the clockwise direction as seen in FIG. 1.

It is desirable that the aqueous treatment solution 2 be always stirred by rotating a stirrer 8 in order to assure that calcium phosphate particles in the aqueous treatment solution 2 does not precipitate on the bottom of the treatment solution bath 1, although the arrangement of the stirrer 8 in that way does not constitute an essential requirement for carrying out the present invention.

Since steps of the method of the invention as defined by the fifth embodiment, other than the coating step, are identical with those of the invention as defined by any one of embodiments two and three, these steps will not be described.

Specifically, the method of the invention as defined by the fifth embodiment is different from that of the second, third and fourth embodiments in respect of the fact that calcium phosphate particles are caused to adhere to the sheet-shaped raw material as they are.

A first step of the method of the invention as defined by the fifth embodiment is carried out by dissolving a water soluble glucan of 0.5 to 25% by weight in water to prepare an aqueous preliminary treatment solution.

Next, a second step is executed by allowing the thus prepared aqueous preliminary treatment solution to adhere to a sheet-shaped raw material.

It is recommended that the adhesion of the aqueous preliminary treatment solution to the sheet-shaped raw material be achieved by dipping the sheet-shaped raw material in the aqueous preliminary treatment solution and then taking up it therefrom in the same manner as the method of the invention as defined in the second embodiment.

Alternatively, it may be achieved by spraying the aqueous preliminary treatment solution over the sheet-shaped raw material in the same manner as in the third embodiment.

Otherwise, it may be achieved by bringing the sheet-shaped raw material in contact with a rotating roller of which part is always immersed in a preliminary treatment solution bath (not shown) so as to allow the sheet-shaped raw material to be coated with the aqueous preliminary treatment solution with the aid of the roller in the same manner as the method of the invention as defined in the fourth embodiment (see FIG. 1).

Next, a third step is carried out by allowing calcium phosphate particles to adhere to the sheet-shaped raw material before the aqueous preliminary treatment solution which had adhered to the sheet-shaped raw material, is completely dried. It is recommended that the adhesion of the calcium phosphate particles to the sheet-shaped raw material be achieved by vibrating a sifter having calcium phosphate particles placed thereon, above the sheet-shaped raw material in the horizontal direction, as to allow the calcium phosphate particles to be distributed over the sheet-shaped raw material.

The distribution of the calcium phosphate particles in the above-described manner is preferably employable for softly depositing calcium phosphate particles on the sheet-shaped raw material in case that the extent of dryness of the aqueous preliminary treatment solution on the sheet-shaped raw material is low, i.e., in the case wherein the aqueous preliminary treatment solution has been just caused to adhere to the sheet-shaped raw material, which is kept still wet. This is because, if the calcium phosphate particles are sprayed over the sheet-shaped raw material, while the latter is sufficiently wetted with the aqueous preliminary treatment solution, there is a possibility that they penetrate into the aqueous preliminary treatment solution with the result that when the aqueous preliminary treatment solution is dried, each calcium phosphate particle is closely surrounded by the water soluble glucan, causing the number of calcium phosphate particles effective for adsorbing infectious or antigenous very fine particles to be reduced.

In some cases, a process of blowing calcium phosphate particles over the sheet-shaped raw material is more acceptably employable than a process of distributing calcium phosphate particles over the sheet-shaped raw material, depending on the extent of drying the sheet-shaped raw material coated with the aqueous preliminary treatment solution or the kind of material employed for the sheet-shaped raw material.

For example, to practice the method of the present invention at a high efficiency, it is desirable to shorten the total processing time by positively evaporating the moisture remaining in the sheet-shaped raw material while the latter moves through a heater. In this case, however, the aqueous preliminary treatment solution is half dried in the course of evaporation with the result that it is unavoidable that the calcium phosphate particles hardly adhere to the sheet-shaped raw material. To obviate the foregoing malfunction, it is recommended that the calcium phosphate particles be caused to adhere to the sheet-shaped raw material by blowing them over the sheet-shaped raw material.

In the case wherein a sheet of pulp paper or a sheet of traditional Japanese paper is employed as a sheet-shaped raw material and calcium phosphate particles are placed on the paper merely by allowing them to adhere to the paper coated with the aqueous preliminary treatment solution, there arises a malfunction in that each of the calcium phosphate particles is readily peeled away from the paper when the surface of the filtering material is rubbed with a certain article, e.g., an operator's hand after completion of a drying operation. In such case as mentioned above, it is recommended that calcium phosphate particles are blown over the paper so that they penetrate into fibers in the paper or a layer of half dried preliminary treatment solution is formed with the aid of kinetic energy given to the respective calcium phosphate particles so as to allow them to stably adhere to the sheet-shaped raw material.

Figure 2:
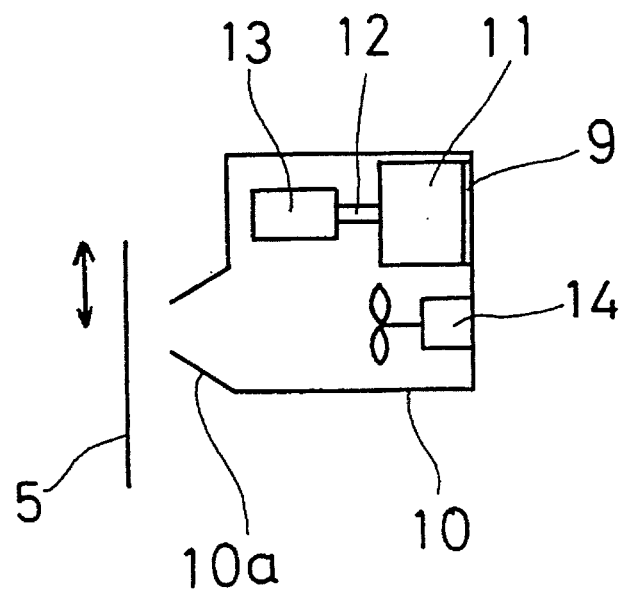
FIG. 2 is an illustrative view which schematically shows the structure of an apparatus for blowing calcium phosphate particles over a sheet-shaped raw material coated with an aqueous treatment solution.

To blow calcium phosphate particles over the sheet-shaped raw material, it is recommended that an apparatus as shown in FIG. 2 be practically used. Specifically, the apparatus includes a case 10 in which a vibrator 11 is disposed with a vibration-proof material 9 interposed therebetween. A sifter 13 having a fine mesh size is mounted on the foremost end of an output shaft 12 of the vibrator 11, and after calcium phosphate particles are filled in the sifter 13, the vibrator 11 is activated to vibrate. As the vibrator 11 operates, the calcium phosphate particles fall down from the sifter 13. At this time, an air stream generated by rotating a blower 14 disposed below the vibrator 11 blows the calcium phosphate particles toward a sheet-shaped raw material 5 having a half dried aqueous preliminary treatment solution adhering thereto through a discharge port 10a in the horizontal direction. Thus, the calcium phosphate particles intensely collide against the sheet-shaped raw material 5, resulting in them reliably adhering to the sheet-shaped raw material 5.

It should be added that a blowing machine usually employed for a so-called sand blasting operation can be used for the foregoing purpose under the condition that the blowing capacity of the blowing machine is substantially reduced.

It is desirable that a quantity of adhesion of the calcium phosphate particles to the sheet-shaped raw material per 1 $m^2$ be determined to be within the range of 5 to 100% based on a unit weight of the sheet-shaped raw material (weight of the sheet-shaped raw material per 1 $m^2$).

The fourth step (drying step) of the method of the invention as defined by the fifth embodiment is identical with that of the method as defined by any one of second, third and fourth embodiments. Thus, a further description of these steps are not necessary.

To practice the method of the invention as defined by any one of the second to fourth embodiment, it is preferable that a product of filtering material passes between an opposing pair of heating rollers so as to thermally press it therebetween at a temperature of about 150° C., causing it to be thermally set, although the arrangement of the heating rollers in that way does not constitute an essential requirement for carrying out the present invention. This is because bonding of the calcium phosphate particles to fibers in the sheet-shaped raw material by the action of hydrogen bond or an electrostatic bond is readily broken or destroyed as the filtering material is repeatedly bent or folded with the exception of the case that calcium phosphate particles tightly penetrate into fibers in the sheet-shaped raw material. The thermal setting of the filtering material is effective not only for strengthening the net-shaped structure of fibers in the sheet-shaped raw material by the action of thermal pressing but also for physically reinforcing the readily breakable bonded structure composed of fibers and calcium phosphate particles. Once the filtering material is subjected to thermal setting, bound water does not escape from the structure of the filtering material but rather only free water is vaporized therefrom, enabling the adsorbing properties of the filtering material to be substantially improved.

An example which represents a virus adsorbing capability of a filtering material produced according to the present invention is shown below in Table 1. It should be noted that the filtering material produced by practicing each of the methods as defined by any one of first to fourth embodiments of the invention exhibits substantially the same properties with each of these methods.

TABLE 1

| sample | virus titer | |
|---|---|---|
| | hemagglutination test | neutralization test (PFU) |
| blank | 256 | $10^4$ |
| unwoven cloth | 256 | $10^4$ |
| filtering material of the present invention | 32 | <10 |

Table 1 shows the results derived from hemagglutination tests and neutralization tests both of which were conducted for determining a virus titer of each filtering material by allowing a suspension containing influenza virus (A/PR/8) to pass through samples of the filtering material.

Here, the hemagglutination test refers to a test of allowing chicken's red cells to be coagulated together in the presence an influenza virus, and the presence or absence of the influenza virus can be detected based on the results representing the presence or absence of the influenza virus after completion of each hemagglutination test. The result representing a virus titer of 256 shows that coagulation took place even when the suspension liquid which has passed through the filtering material was diluted with saline by a quantity of 256 times.

In addition, the neutralization test refers to a test of allowing the influenza virus to destroy the lung cells of a human's embryo when it adheres to them, and the numeral $10^4$ representing the virus titer shows the number of destroyed cells.

Table 2 shows, by way of example, the bacteria adsorbing capability of the filtering material produced with the method of the present invention.

TABLE 2

| sample | the number of bacteria which has passed through the filtering material | | |
|---|---|---|---|
| | Escherichia coli | Staphylococcus aureus | Pseudomonas aerugonosa |
| sheet-shaped paper | $10^5$ | $10^5$ | $10^5$ |
| unwoven cloth | $10^5$ | $10^5$ | $10^5$ |
| filtering material (sheet-shaped paper used as a sheet) | <10 (detection failed) | <10 | <10 |
| filtering material (unwoven cloth used as a sheet) | <10 | <10 | <10 |

Specifically, Table 2 shows, by way of the number of bacteria remaining in each suspension after completion of flowing through the filtering material of the present invention, the capability for adsorbing bacteria in the filtering material when suspensions each containing bacteria, i.e., *Escherichia coli*, *Staphylococcus aureus* and *Pseudomonas aerugonosa* were caused to pass through the filtering material of the present invention. It should be noted that the number of bacteria contained in each suspension liquid prior to flowing through the filtering material of the present invention was $10^{6.}$ As is apparent from Table 2, the filtering material of the present invention assures that any kind of bacteria is not permitted to pass therethrough.

Next, an example which represents the deodoring capability of the filtering material of the present invention is shown below in Table 3.

TABLE 3

| odoring substance | concentration measured at each measuring time (ppm) | | |
|---|---|---|---|
| | at a starting time | after one minute | after two minute |
| ammonia | 100 | 3 | 0 |
| hydrogen sulfide | 100 | 5 | 0 |
| trimethylamine | 100 | 4 | 0 |
| methyl mercaptan | 100 | 20 | 8 |
| phenol | 50 | 5 | 0 |
| acetaldehyde | 50 | 10 | 2 |
| valeric acid | 50 | 20 | 7 |
| acetic acid | 50 | 8 | 0 |
| ethylene oxide | 50 | 4 | 0 |

Specifically, Table 3 shows the results derived from evaluations conducted on the deodorizing capability of the filtering material of the present invention which was practically evaluated in the stationary state. In practice, the deodoring capability of the filtering material of the present invention was evaluated in the stationary state in such a manner that an odoring substance having a certain initial concentration (e.g., 50 ppm or 100 ppm) and a square filtering material of the present invention having dimensions of 10 cm×10 cm was received in a tetrabag having a capacity of 3 liters and the present concentration of the deodorizing substance was measured at each sampling time by using a detection tube. Numerals representing the results derived from the measurements are shown in Table 3 in ppm units.

In addition, another example which represents the deodoring capability of the filtering material of the present invention is shown in Table 4.

TABLE 4

| odoring substance | filtering material | concentration prior to air passage | concentration prior to air passage | differntial pressure (mm H$_2$O) |
|---|---|---|---|---|
| ammonia | unwoven cloth | 100 | 60 | 6.0 |
| | filtering material of the present invention | 100 | 5 | 6.2 |
| trimethyl-amine | unwoven cloth | 100 | 70 | 6.1 |
| | filtering material of the same | 100 | 2 | 6.1 |
| hydrogen sulfide | unwoven cloth | 100 | 60 | 6.0 |
| | filtering material of the same | 100 | 4 | 6.1 |
| ethylene oxide | unwoven cloth | 50 | 40 | 6.0 |
| | filtering material of the same | 50 | 4 | 6.1 |

Similarly, Table 4 shows the results derived from evaluations conducted on the deodoring capability of the filtering material present invention which was practically evaluated by measuring air permeability and deodoring capability of the filtering material of the present invention. In practice, the air permeability and the deodoring capability of the filtering material of the present invention were evaluated in such a manner that an air stream containing an odoring substance having a certain initial concentration (e.g., 50 ppm or 100 ppm) was caused to pass through the filtering material and the concentration of the deodoring substance after completion of the passage of the air stream therethrough was then measured. Numerals on the table represent the deodoring capability of the filtering material with ppm as a unit.

Specifically, a tetrabag having a capacity of 3 liters for supplying an air stream was connected to another tetrabag having a capacity of 3 liters for receiving the supplied air stream via an air venting tube. In addition, a pump, a flow meter and a holder for the filtering material of the present invention were disposed along the air venting tube in accordance with the order as seen from the supply side. As the pump is driven, an air stream containing an odoring substance was forcibly caused to pass through the filtering material held by the holder, and the concentration of the odoring substance remaining in the air stream in the tetrabag on the recovery side was then measured by using a detection tube. It should be noted that the flow rate of the air stream was set to 1 liter/minute and the air penetration surface area was set to 15 cm$^2$. In addition, a differential pressure shown in Table 4 represents a difference between the pressure of the air stream before it reached the filtering material and the pressure of the same after it passed therethrough. Numerals shown in Table 4 are represented by mm H$_2$O in units.

While the present invention has been described above with respect to several embodiments and examples thereof, it should of course be understood that the present invention should not be limited only to these embodiments but various change or modifications may be made without departure from the scope of the present invention as defined by the appended claims.

What is claimed is:

1. A method of producing a filtering material, comprising:

a first step of dispersing calcium phosphate particles of 0.5 to 40% by weight, excluding porous apatite particles, and which calcium phosphate particles have not been treated to impart porosity thereto and a water soluble glucan of 0.5 to 15% by weight in water to prepare an aqueous treatment solution, a second step of dipping a sheet-shaped raw material in said aqueous treatment solution and taking up said sheet-shaped raw material coated with said aqueous treatment solution, and a third step of drying said sheet-shaped raw material coated with said aqueous treatment solution after completion of the taking-up operation to produce said filtering material.

2. The method according to claim 1, wherein a content of calcium phosphate particles in said aqueous treatment solution is set to 0.5 to 30% by weight.

3. A method of producing a filtering material comprising:

a first step of dispersing calcium phosphate particles of 0.5 to 40% by weight, excluding porous apatite particles, and which calcium phosphate particles have not been treated to impart porosity thereto and a water soluble glucan of 0.5 to 15% by weight in water to prepare an aqueous treatment solution, a second step of spraying said aqueous treatment solution over a sheet-shaped raw material, and a third step of drying said sheet-shaped raw material coated with the sprayed aqueous treatment solution to produce said filtering material.

4. The method according to claim 3, wherein a content of calcium phosphate particles in said aqueous treatment solution is set to 0.5 to 30% by weight.

5. A method of producing a filtering material comprising:

a first step of dispersing calcium phosphate particles of 0.5 to 40% by weight, excluding porous apatite particles, and which calcium phosphate particles have not been treated to impart porosity thereto and a water soluble glucan of 0.5 to 15% by weight in water to prepare an aqueous treatment solution, a second step of adhering said aqueous treatment solution to a sheet-shaped raw material with a rotating roller of which part is always immersed in said aqueous treatment solution, and a third step of drying said sheet-shaped raw material having said aqueous treatment solution adhering thereto to produce said filtering material.

6. The method according to claim 5, wherein a content of calcium phosphate particles in said aqueous treatment solution is set to 0.5 to 30% by weight.

7. A method of producing a filtering material comprising:

a first step of dissolving a water soluble glucan of 0.5 to 25% by weight in water to prepare an aqueous preliminary treatment solution, a second step of adhering said aqueous preliminary treatment solution to a sheet-shaped raw material, a third step of adhering calcium phosphate particles to said sheet-shaped raw material before said sheet-shaped raw material having said aqueous treatment solution adhering thereto is completely dried, and a fourth step of drying said sheet-shaped raw material having said aqueous preliminary treatment solution and said calcium phosphate particles adhering therein, with the proviso that said calcium phosphate particles exclude porous apatite particles therefrom, and which calcium phosphate particles have not been treated to impart porosity thereto.

8. The method according to claim 7, wherein said second step is executed by dipping said sheet-shaped raw material in said aqueous treatment solution and then taking up said sheet-shaped raw material coated with said aqueous preliminary treatment solution so as to adhere said aqueous preliminary treatment solution to said sheet-shaped raw material.

9. The method according to claim 7, wherein said second step is executed by spraying said aqueous preliminary treatment solution, so as to coat and adhere said aqueous preliminary treatment solution onto said sheet-shaped raw material.

10. The method according to claim 7, wherein said second step is executed by bringing said sheet-shaped raw material in contact with a rotating roller of which part is always immersed in said aqueous preliminary treatment solution so as to adhere said aqueous preliminary treatment solution to said sheet-shaped raw material.

11. The method according to any one of claim 7 to claim 10, wherein said third step is executed by spreading said calcium phosphate particles over said sheet-shaped raw material coated with said aqueous preliminary treatment solution so as to adhere said calcium phosphate particles to said sheet-shaped raw material.

12. The method according to claim any one of claim 7 to claim 10, wherein said third step is executed by blowing said calcium phosphate particles over said sheet-shaped raw material coated with said aqueous preliminary treatment solution so as to adhere said calcium phosphate particles to said sheet-shaped raw material.

* * * * *